United States Patent [19]

Cline

[11] 4,387,956
[45] Jun. 14, 1983

[54] FIBER OPTIC INTERLOCK
[75] Inventor: Charles D. Cline, Dallas, Tex.
[73] Assignee: Rockwell International Corporation, El Segundo, Calif.
[21] Appl. No.: 271,909
[22] Filed: Jun. 9, 1981
[51] Int. Cl.³ .............................................. G02B 7/26
[52] U.S. Cl. ................................ 350/96.20; 339/91 R
[58] Field of Search ...................... 350/96.20, 96.21; 339/17 R, 17 C, 17 LC, 39, 91 R

[56] References Cited
U.S. PATENT DOCUMENTS

| | | | |
|---|---|---|---|
| 4,002,386 | 1/1977 | McKenzie | 312/320 |
| 4,081,208 | 3/1978 | Meade | 350/96.20 |
| 4,260,210 | 4/1981 | Babuka et al. | 339/91 R |
| 4,268,114 | 5/1981 | d'Auria et al. | 350/96.20 |
| 4,273,413 | 6/1981 | Bendiksen et al. | 350/96.20 |
| 4,327,964 | 5/1982 | Haesly et al. | 350/96.20 |

OTHER PUBLICATIONS

"Amphenol Fiber Optic Interconnections", FOC Series, Amphenol North America, Bunker Ramo Corp., RF Operations, 33 E. Franklin St., Danbury, Ct. 06810.

Primary Examiner—John D. Lee
Attorney, Agent, or Firm—Michael E. Taken; V. Lawrence Sewell; Howard R. Greenberg

[57] ABSTRACT

A retaining device is provided for preventing removal of a fiber optic connector module from a card cage when a mating fiber optic cable connector is attached to the module. A pivoted release lever on the module has a hook automatically engaging a slot in the card cage upon insertion, and is manually operable to a release position only when the mating fiber optic cable connector is disconnected from the module.

10 Claims, 3 Drawing Figures

U.S. Patent  Jun. 14, 1983  4,387,956
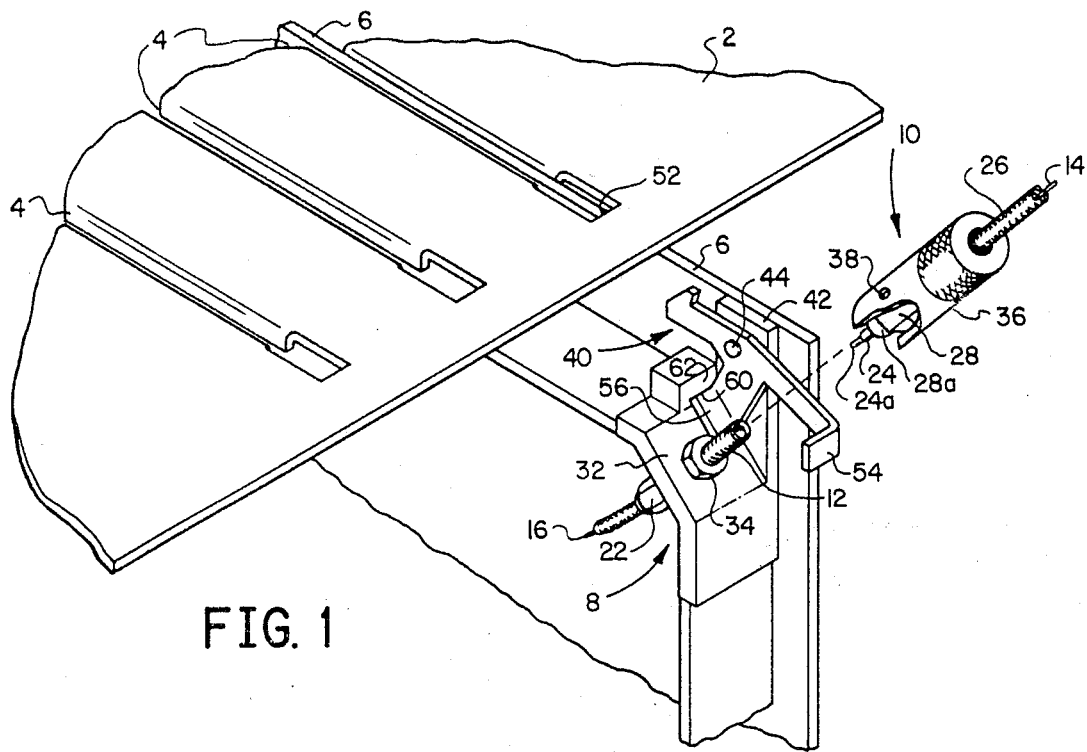
FIG. 1
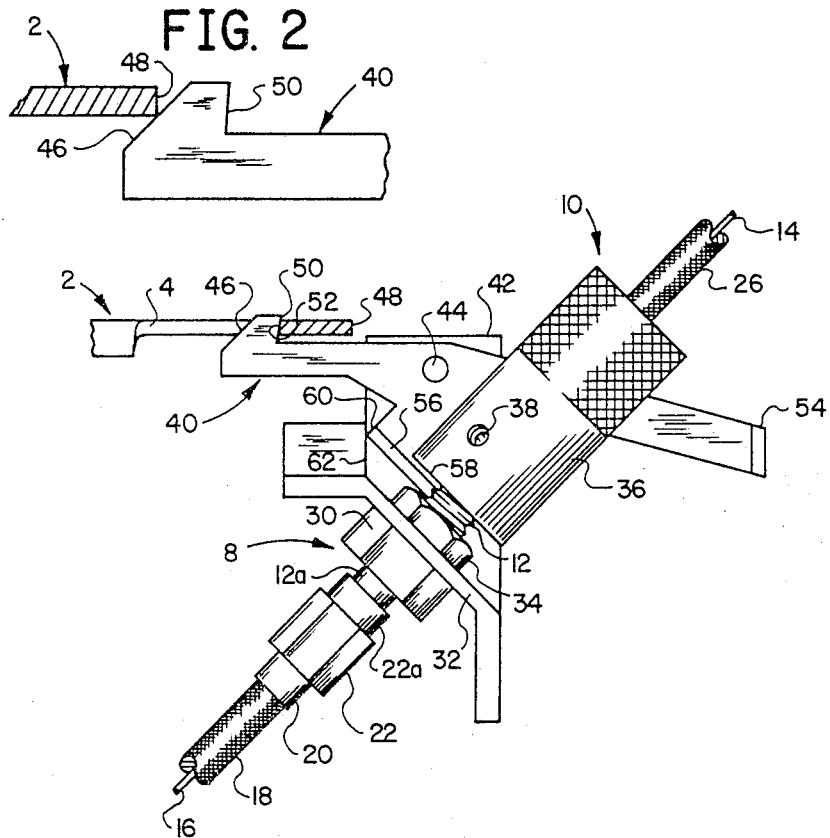
FIG. 2
FIG. 3

FIBER OPTIC INTERLOCK

TECHNICAL FIELD

The invention relates to a fiber optic cable connection link system for a circuit card cage, and more particularly to a retaining device or interlock for preventing removal of a fiber optic connector module from the card cage when a mating fiber optic cable connector is attached to the module.

BACKGROUND AND SUMMARY

Fiber optic cable interconnection links are known, and include a pair of mating connectors providing precise registered alignment of facing fiber optic cables to afford light transmission therethrough. Fiber optic connection links for card cage modules are also known. A card cage or rack houses a plurality of circuit cards, usually in spaced parallel relation by means of tracks or grooves engaging the edges of respective circuit cards. The card has a fiber optic connector module to which a mating fiber optic cable connector is attached to afford transmission of light between the external cable and the optical circuitry in the module on the circuit card.

A need has arisen for a safety retaining device for preventing removal of the module from the card cage when the mating fiber optic cable connector is attached, which removal may otherwise break or damage the fiber optic cable and associated components. The present invention satisfies this need in a particularly simple and efficient manner.

A module retaining device is provided in the form of an interlocking release lever having a hook automatically engaging the card cage upon insertion to prevent removal of the module. The end of the lever is operated by the user to release the hook while extracting the module from the card cage. If the mating fiber optic cable connecter is attached, the lever cannot be operated to release the hook because of an interference stop tab striking the mating connector, whereby to prevent removal of the module.

BRIEF DESCRIPTION OF THE DRAWINGS

FIG. 1 is a pictorial illustration of a fiber optic cable connector card cage module interlock constructed in accordance with the invention.

FIG. 2 is an isolated view of the leading camming edge of the release lever of FIG. 1 showing its camming engagement with the card cage upon insertion.

FIG. 3 is a side elevation view of the interlock of FIG. 1, with the mating fiber optic cable connector attached.

DETAILED DESCRIPTION

FIG. 1 shows a portion of a card cage 2 having a plurality of cutout tracks or grooves 4, each for receiving a circuit card 6 and fiber optic connector module 8. The card cage has a bottom panel (not shown) with corresponding tracks or grooves for receiving the bottom edge of the circuit card and connector module. This mounting arrangement is known in the art, for example as shown in U.S. Pat. No. 4,002,386, hereby incorporated herein.

A mating fiber optic cable connector 10 is attached to module 8 at threaded sleeve 12 to provide registered alignment of fiber optic cables 14 and 16, to enable light transmission therethrough. Module 8 houses various electronic and optical circuitry. The fiber optic cable connection components of module 8 are known, and will only be briefly described. An exemplary reference is "Amphenol Fiber Optic Interconnections", FOC Series, Amphenol North America, Bunker Ramo Corporation, RF Operations, 33 E. Franklin St., Danbury, Ct. 06810.

Fiber optic cable 16 and its protective sheathing 18, FIG. 3, are secured in a shaft 20. Shaft 20 extends through a hex nut 22 which is journaled on shaft 20 for rotation but is constrained against axial movement. Nut 22 is internally threaded for being screwed on to externally threaded sleeve 12. Connector 10 likewise has a shaft 24 securing fiber optic cable 14 and its protective sheathing 26, which shaft extends through hex nut 28 which is screwed on to sleeve 12.

As seen in FIG. 1, hex nut 28 has an annular extension 28a beyond which shaft 24 extends. Hex nut 22 likewise has an annular extension 22a beyond which shaft 20 extends within unthreaded central sleeve section 12a. Shaft 24 has a reduced end face 24a which faces a comparable reduced end face of shaft 20 within sleeve 12. Sleeve 12 has a hex nut 30 integrally formed thereon and is mounted to oblique module surface 32 by means of threaded nut 34 screwed on to sleeve 12 to engage one side of surface 32, with integral nut 30 engaging the other side of surface 32.

In accordance with the present invention, an enlarged annular collar 36 is provided around hex nut 28. This add-on collar 36 has an internal hex shape at one end for complimentally receiving hex nut 28 and for rotating the latter to screw it on to and off of sleeve 12. Set screw 28 may be tightened to prevent axial movement of collar 36 along nut 28. Add-on collar 36 provides extended radial dimension to connector 10 which is desirable in conjunction with the interlocking release lever to be described.

FIG. 1 shows connector module 8 slightly withdrawn from card cage 2. A release lever 40 is pivotally mounted to the module at upstanding surface 42 of the module by means of pivot pin 44. Lever 40 has a leading cam surface 46 which engages card cage 2 at edge 48, FIG. 2, upon insertion of the module to cammingly pivot the lever counter-clockwise until a hook portion 50 of the lever engages card cage 2 at the front end 52 of groove or slot 4. This engagement of hook portion 50 with card cage 2 prevents withdrawal of module 8.

Lever 40 has a user engageable trailing release portion 54 for manually pivoting lever 40 counter-clockwise to a release position to disengage hook portion 50 from edge 52 to permit removal of the module. Lever 40 has an interference stop portion or tab 56 bent toward and under the end face 58 of collar 36. Interference stop tab 56 strikes end face 58 of the mating connector 10 when the latter is attached to module 8, to prevent pivoting of lever 40 to the release position. This prevents disengagement of hook portion 50 from card cage edge 52, whereby to prevent removal of module 8 from the card cage.

Interference stop portion 56 is generally centrally located on lever 40 and comprises a bent tab extending substantially perpendicularly from the lever and having a path of travel intersecting mating connector 10 when the latter is attached to module 8. The plane of pivotal movement of lever 40 is parallel to the fiber optic cable line at the module interface. Lever 40 is pivotally mounted between leading cam surface 46 and central interference stop portion 56. The lever is pivoted forwardly of its center of gravity such that the lever naturally pivots by gravity clockwise towards the hook latched position and away from the release position.

Lever 40 has a pivot stop portion 60 engageable with module 8 at upstanding surface 62 to limit clockwise pivotal movement of lever 40 away from said release position when module 8 is removed from card cage 2. Pivot stop 60 provides alignment of leading camming surface 46 for camming engagement with card cage edge 48 upon insertion of the module. In preferred form, pivot stop portion 60 is the leading edge of interference stop portion tab 56 such that the latter, in addition to being engageable with end face 58 of mating connector 10, is further engageable with module 8 to limit pivotal movement of lever 40. In another embodiment, the pivot stop portion may be a rearward extension from tab 56 or another tab from the main body of lever 40 which extends down to engage oblique surface 32 to limit clockwise pivotal movement of lever 40 and provide the leading camming alignment of FIG. 2.

It is recognized that various modifications are possible within the scope of the appended claims.

I claim:

1. A retaining device for preventing removal of a fiber optic connector module from a card cage when a fiber optic cable and mating connector is attached to said module, comprising:

a release lever pivotally mounted to said module and having a hook portion engaging said card cage upon insertion of said module into said card cage to prevent withdrawal of said module, said lever being manually pivotable to a release position to disengage said hook portion from said card cage to permit removal of said module, said lever having an interference stop portion which strikes said mating connector of said fiber optic cable when the latter is attached to said module, to prevent pivoting of said lever to said release position and hence prevent disengagement of said hook portion from said card cage, whereby to prevent removal of said module.

2. The invention according to claim 1 wherein said lever has a leading cam surface engaging said card cage upon insertion of said module to cammingly pivot said lever towards said release position until said hook portion engages said card cage.

3. The invention according to claim 2 wherein said lever has a user engagable trailing release portion for manually pivoting said lever to said release position.

4. The invention according to claim 3 wherein said lever has a central interference stop portion having a path of travel intersecting said mating connector of said fiber optic cable when the latter is attached to said module.

5. The invention according to claim 4 wherein the plane of pivotal movement of said lever is parallel to the fiber optic cable line at the module interface, and wherein said mating connector of said fiber optic cable includes an enlarged collar having an end facing said module, and wherein said central interference stop portion extends beneath said facing end of said collar to strike the latter when there is an attempt to pivot said lever to said release position.

6. The invention according to claim 5 wherein said central interference stop portion comprises a bent tab extending substantially perpendicularly from said lever.

7. The invention according to claim 6 wherein said lever is pivotally mounted between said leading cam surface and said central interference stop portion.

8. The invention according to claim 6 wherein said lever is pivoted forwardly of its center of gravity such that said lever pivots by gravity towards the hook latched position and away from said release position.

9. The invention according to claim 8 wherein said lever has a pivot stop portion engageable with said module to limit pivotal movement of said lever in the direction away from said release position when said module is removed from said card cage, such that said leading camming surface is aligned for camming engagement with said card cage upon insertion of said module.

10. The invention according to claim 8 wherein said interference stop portion is further engageable with said module to limit pivotal movement of said lever in the direction away from said release position when said module is removed from said card cage, such that said leading camming surface is aligned for camming engagement with said card cage upon insertion of said module.

* * * * *